No. 736,232. PATENTED AUG. 11, 1903.
C. DAVIS.
GOLF BALL.
APPLICATION FILED FEB. 18, 1903.
NO MODEL.

Inventor
Cleland Davis.

Witnesses
Geo. H. Byrne.
Fred W. England.

By Wilkinson & Fisher
Attorneys

No. 736,232. Patented August 11, 1903.

UNITED STATES PATENT OFFICE.

CLELAND DAVIS, OF THE UNITED STATES NAVY, ASSIGNOR TO THE CAMBRIDGE MANUFACTURING COMPANY, OF WILMINGTON, DELAWARE, A CORPORATION OF DELAWARE.

GOLF-BALL.

SPECIFICATION forming part of Letters Patent No. 736,232, dated August 11, 1903.

Application filed February 18, 1903. Serial No. 143,984. (No model.)

*To all whom it may concern:*

Be it known that I, CLELAND DAVIS, a lieutenant in the United States Navy, stationed at Washington, in the District of Columbia, have invented certain new and useful Improvements in Golf-Balls, (Case I;) and I do hereby declare the following to be a full, clear, and exact description of the invention, such as will enable others skilled in the art to which it appertains to make and use the same.

My invention relates to improvements in golf-balls, and it is intended to provide a golf-ball that will give a long and accurate flight and at the same time will be well suited for putting or approaching.

My invention will be understood by reference to the accompanying drawings, in which the same parts are indicated by the same letters throughout the several views.

Figure 1:
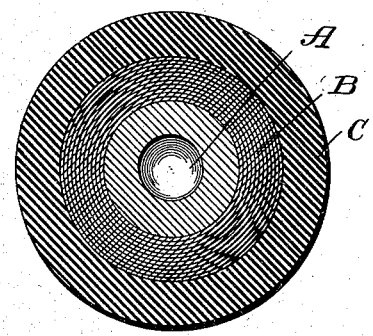
Figure 4:
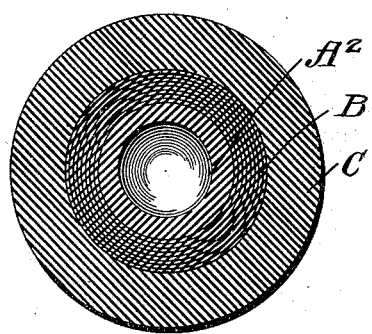
Figure 2:
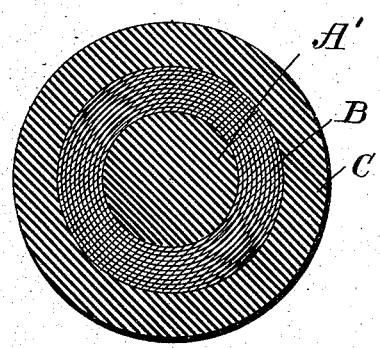
Figure 3:
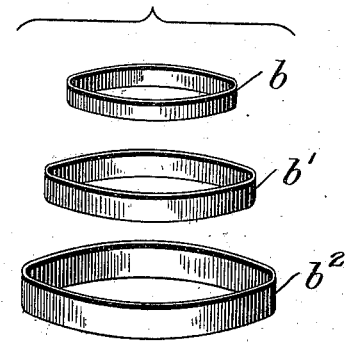
Figure 5:
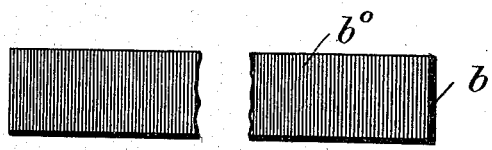

Figure 1 represents a cross-section of one form of ball constructed according to my invention. Fig. 2 is a cross-section of another form of ball. Fig. 3 shows three of the rubber bands used in making the ball. Fig. 4 is a cross-section of still another form of the ball. Fig. 5 is a detail, on an enlarged scale, of one of the rubber bands and shows the grain or fiber of the same.

The ball shown in Fig. 1 consists of a hollow core A, made of a nitrocellulose compound, such as celluloid, over which core are tightly stretched a layer B of bands of rubber and the whole is inclosed in an outer shell of gutta-percha or balata gum, preferably the latter. In order to make the layer of rubber bands B hard and dense, at the same time highly elastic, I construct the bands with the grain or fiber running crosswise, as indicated at $b^0$ on the band $b$ of Fig. 5. Ordinarily rubber bands are made with the grain running longitudinally. I found from experiment that by making the grain run transversely, as shown, a much harder and more compact mass is obtainable.

In the construction of the ball the bands may be of different sizes or, as indicated at $b$, $b'$, and $b^2$, in Fig. 3, they may be made all of the same size; but I preferably employ bands of different sizes.

In the form of ball shown in Fig. 2 a solid core A', preferably of gutta-percha, is inclosed in the layer of bands B and the whole is incased in the shell C of gutta-percha or balata gum. In the ball shown in Fig. 4 $A^2$ indicates a hollow steel shell, which is hollowed out sufficiently so that the ball when completed shall be of slightly less specific gravity than water. In the same way the ball shown in Figs. 1 and 2 should be of a specific gravity slightly less than that of water. The purpose of this is not only to have the balls of standard weight, which is very important, but also that the balls may float in water and not be lost when a water hazard is encountered.

Having thus described my invention, what I claim, and desire to secure by Letters Patent of the United States, is—

1. A golf-ball comprising a core, a series of rubber bands having the grain or fiber running transversely stretched thereon in the form of a hollow sphere, and an outer shell of elastic material compressed over said bands, substantially as described.

2. A golf-ball comprising a core of elastic material, a series of rubber bands having the grain or fiber running transversely stretched thereon in the form of a hollow sphere, and an elastic shell compressed over said bands, substantially as described.

3. A golf-ball comprising a hollow core of elastic material, a series of rubber bands having the grain or fiber running transversely stretched thereon in the form of a hollow sphere, and an elastic shell compressed over said bands, substantially as described.

4. A golf-ball composed of a hollow core of elastic material having greater specific gravity than water, a series of rubber bands having the grain or fiber running transversely stretched thereon in the form of a hollow sphere, and an elastic shell compressed over said bands, substantially as described.

5. A golf-ball consisting of a hollow core, of a nitrocellulose compound, a series of rubber bands having the grain or fiber running transversely stretched thereon in the form of a hollow sphere, and an elastic shell compressed over said bands, substantially as described.

6. A golf-ball comprising a core, a series of rubber bands having the grain or fiber running transversely stretched thereon in the form of a hollow sphere, and a shell composed of balata gum compressed over said rubber bands, substantially as described.

7. A golf-ball comprising a core of elastic material, a series of rubber bands having the grain or fiber running transversely stretched thereon in the form of a hollow sphere, and a shell composed of balata gum compressed over said rubber bands, substantially as described.

8. A golf-ball comprising a hollow core of elastic material, a series of rubber bands having the grain or fiber running transversely stretched thereon in the form of a hollow sphere, and a shell composed of balata gum compressed over said rubber bands, substantially as described.

9. A golf-ball composed of a hollow core of elastic material having a greater specific gravity than water, a series of rubber bands having the grain or fiber running transversely stretched thereon in the form of a hollow sphere, and a shell composed of balata gum compressed over said rubber bands, substantially as described.

10. A golf-ball consisting of a hollow core, of a nitrocellulose compound, a series of rubber bands having the grain or fiber running transversely stretched thereon in the form of a hollow sphere, and a shell composed of balata gum compressed over said rubber bands, substantially as described.

11. A golf-ball having a core of molded elastic material of spherical shape, from which a portion or portions are omitted or removed, a series of rubber bands having the grain or fiber running transversely stretched on said core, and a shell of hard elastic material compressed over said series of rubber bands, substantially as described.

12. A golf-ball having a core of molded elastic material of spherical shape, from which a portion or portions are omitted or removed, a series of rubber bands having the grain or fiber running transversely stretched on said core, and an outer shell composed of balata gum compressed over said rubber bands, substantially as described.

In testimony whereof I affix my signature in presence of two witnesses.

CLELAND DAVIS.

Witnesses:
JAS. H. BLACKWOOD,
J. STEPHEN GIUSTA.